(12) United States Patent
Kawasaki et al.

(10) Patent No.: US 7,006,769 B1
(45) Date of Patent: Feb. 28, 2006

(54) METHOD FOR OPTICAL FIBER COMMUNICATION, AND DEVICE AND SYSTEM FOR USE IN CARRYING OUT THE METHOD

(75) Inventors: Yumiko Kawasaki, Shinagawa-ku (JP); Kazuo Yamane, Kawasaki (JP); Takashi Tsuda, Kawasaki (JP); Satoru Okano, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/256,079

(22) Filed: Feb. 24, 1999

(30) Foreign Application Priority Data

Mar. 18, 1998 (JP) .......................................... 10-068385

(51) Int. Cl.
*H04B 10/00* (2006.01)
*H04B 10/12* (2006.01)

(52) U.S. Cl. ....................... 398/158; 398/147; 398/159
(58) Field of Classification Search ................ 359/110, 359/153, 181, 188, 177, 195; 398/25, 26, 398/27, 29, 33, 77, 147, 162, 158, 159
See application file for complete search history.

(56) References Cited

U.S. PATENT DOCUMENTS

| 5,315,426 | A | * | 5/1994 | Aoki |
| 5,524,076 | A | | 6/1996 | Rolland et al. |
| 5,585,954 | A | * | 12/1996 | Taga et al. |
| 5,784,184 | A | * | 7/1998 | Alexander et al. |
| 5,917,637 | A | * | 6/1999 | Ishikawa et al. |
| 5,999,298 | A | * | 12/1999 | Ishizaka |
| 6,031,644 | A | * | 2/2000 | Utsumi |
| 6,115,403 | A | * | 9/2000 | Brenner et al. |
| 6,252,692 | B1 | * | 6/2001 | Roberts |

FOREIGN PATENT DOCUMENTS

| EP | 0812075 A2 | 12/1997 |
| GB | 2308675 | 7/1997 |
| GB | 2316821 | 3/1998 |
| JP | 61-212125 | 9/1986 |
| JP | 3-171036 | 7/1991 |
| JP | 5-110516 | 4/1993 |
| JP | 9-284218 | 10/1997 |
| WO | WO 96/23372 | 8/1996 |

* cited by examiner

*Primary Examiner*—M. R. Sedighian
*Assistant Examiner*—Dzung Tran
(74) *Attorney, Agent, or Firm*—Staas & Halsey LLP

(57) ABSTRACT

The invention, relates to a method for optical fiber communication. An optical signal having chirping determined by a chirp parameter is output to an optical fiber transmission line. The optical signal transmitted by the optical fiber transmission line is converted into an electrical signal. A bit error of the electrical signal is detected. Then, the chirp parameter is controlled so that the bit error detected above is reduced. According to this method, the chirp parameter is controlled so that the bit error detected is reduced. Accordingly, a chirping occurring in the optical fiber transmission line can be suppressed by the chirping of the optical signal to be output to the optical fiber transmission line, thereby compensating for chromatic dispersion and nonlinearity.

15 Claims, 18 Drawing Sheets

F I G. 1
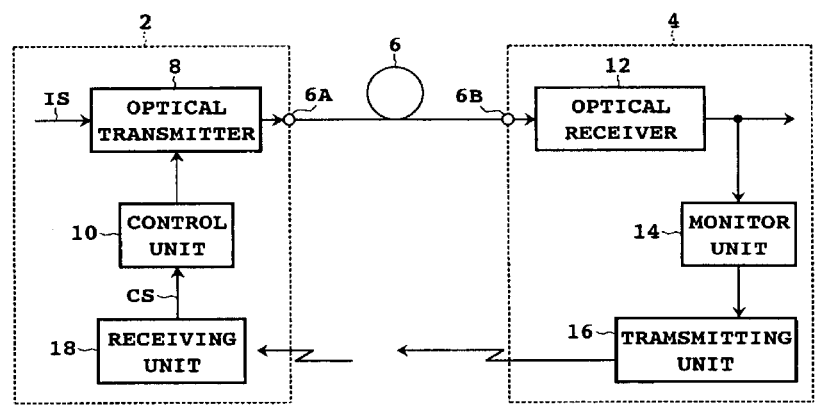

FIG.5A
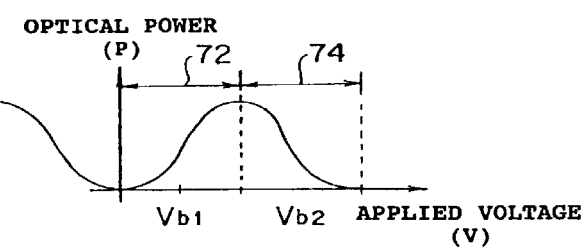
FIG.5B
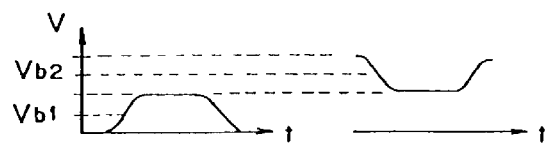
FIG.5C
FIG.5D
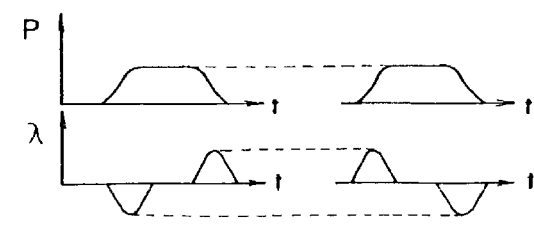
RED SHIFT  α >0          BLUE SHIFT  α <0

F I G. 1 5
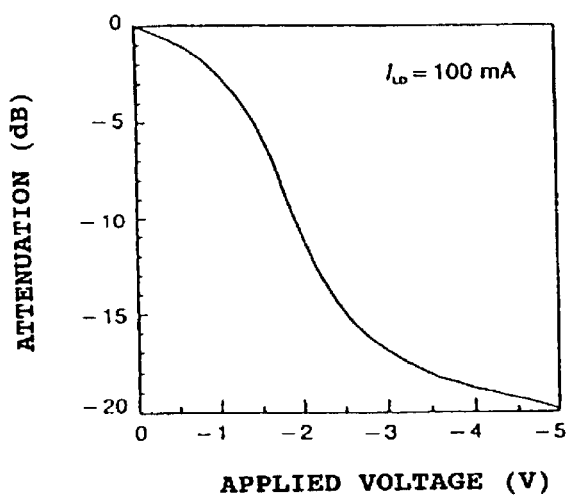

METHOD FOR OPTICAL FIBER COMMUNICATION, AND DEVICE AND SYSTEM FOR USE IN CARRYING OUT THE METHOD

BACKGROUND OF THE INVENTION

1. Field of the Invention

The present invention relates generally to compensation for chromatic dispersion and nonlinearity in an optical fiber, and more particularly to a method for optical fiber communication which can compensate for chromatic dispersion and nonlinearity in an optical fiber, and a device and system for use in carrying out the method.

2. Description of the Related Art

Owing to recent developments of low-loss silica optical fibers, various optical fiber communication systems each using such an optical fiber as a transmission line have been put to practical use. The optical fiber itself has a very wide band. However, a transmission capacity by the optical fiber is actually limited by a system design. The most important limitation is due to waveform distortion by chromatic dispersion occurring in the optical fiber. Further, the optical fiber attenuates an optical signal at a rate of about 0.2 dB/km, for example. Loss of the optical signal due to this attenuation has been compensated for by adopting an optical amplifier such as an erbium doped fiber amplifier (EDFA) which is a typical example. The EDFA has a gain band in a 1.55 $\mu$m band where a silica optical fiber gives a lowest loss.

The chromatic dispersion that is often referred to simply as dispersion is a phenomenon such that the group velocity of an optical signal in an optical fiber changes as a function of the wavelength (or frequency) of the optical signal. In a standard single-mode fiber, for example, an optical signal having a longer wavelength propagates faster than an optical signal having a shorter wavelength in a wavelength region shorter than 1.3 $\mu$m, and the resultant dispersion is usually referred to as normal dispersion. In this case, the dispersion (whose unit is ps/nm/km) takes on a negative value. In contrast, an optical signal having a shorter wavelength propagates faster than an optical signal having a longer wavelength in a wavelength region longer than 1.3 $\mu$m, and the resultant dispersion is usually referred to as anomalous dispersion. In this case, the dispersion takes on a positive value.

In recent years, the nonlinearities of an optical fiber have received attention in association with an increase in optical signal power due to the use of an EDFA. The most important nonlinearity that limits a transmission capacity is an optical Kerr effect occurring in an optical fiber. The optical Kerr effect is a phenomenon such that the refractive index of an optical fiber changes with the power of intensity of an optical signal. A change in the refractive index modulates the phase of an optical signal propagating in an optical fiber, resulting in the occurrence of frequency chirping which changes a signal spectrum. This phenomenon is known as self-phase modulation (SPM). There is a possibility that such a change in spectrum due to SPM may further enlarge the waveform distortion due to chromatic dispersion.

In this manner, the chromatic dispersion and the optical Kerr effect impart waveform distortion to an optical signal with an increase in transmission distance. Accordingly, to allow long-haul transmission by an optical fiber, the chromatic dispersion and the nonlinearity must be controlled, compensated, or suppressed.

SUMMARY OF THE INVENTION

It is therefore an object of the present invention to provide a method for optical fiber communication which can compensate for chromatic dispersion and nonlinearity to allow long-haul transmission, and to also provide a device and system for use in carrying out the method. Other objects of the present invention will become apparent from the following description.

In accordance with an aspect of the present invention, there is provided a method for optical fiber communication. An optical signal having a chirping determined by a chirp parameter is first output to an optical fiber transmission line. The optical signal transmitted by the optical fiber transmission line is next converted into an electrical signal. A bit error of the electrical signal is next detected. Then, the chirp parameter mentioned above is controlled so that the bit error detected above is reduced.

According to this method, the chirp parameter is controlled so that the bit error detected is reduced. Accordingly, a chirping occurring in the optical fiber transmission line can be suppressed by the chirping of the optical signal to be output to the optical fiber transmission line, thereby compensating for chromatic dispersion and nonlinearity.

For example, in the case that the optical signal is generated by optical modulation using a Mach-Zehnder optical modulator, the sign of the chirp parameter of the optical signal to be output to the optical fiber transmission line can be switched by switching an operating point of the Mach-Zehnder optical modulator.

Further, in the case that the optical signal is generated by optical modulation using an electroabsorption optical modulator, the chirp parameter can be continuously changed according to a bias voltage to be applied to the electroabsorption optical modulator. Accordingly, the chirp parameter can be adjusted to an optimum value so that the bit error detected is minimized.

Preferably, the optical signal is generated by optical modulation based on a modulating signal obtained by adding a redundancy code to a transmission data code. In this case, the bit error of the electrical signal can be corrected according to the redundancy code. Particularly, the bit error of the electrical signal can be detected by counting the number of corrections of the bit error.

In accordance with another aspect of the present invention, there is provided a system comprising first and second terminal devices and an optical fiber transmission line connecting the first and second terminal devices. The first terminal device comprises an optical transmitter and a control unit. The optical transmitter outputs an optical signal having a chirping determined by a chirp parameter to the optical fiber transmission line. The control unit controls the chirp parameter according to a control signal. The second terminal device comprises an optical receiver and a monitor unit. The optical receiver converts the optical signal transmitted by the optical fiber transmission line into an electrical signal. The monitor unit detects a bit error of the electrical signal. Supervisory information on the bit error detected is transmitted back to the first terminal device. With this configuration, the control signal mentioned above can be generated in the first terminal device so that the bit error detected by the monitor unit is reduced.

In accordance with a further aspect of the present invention, there is provided a terminal device comprising an optical transmitter for outputting an optical signal having a chirping determined by a chirp parameter to an optical fiber transmission line; means for receiving supervisory information on a bit error detected in relation to the optical signal transmitted by the optical fiber transmission line; and means for controlling the chirp parameter according to the supervisory information so that the bit error detected is reduced.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 1 is a block diagram showing a preferred embodiment of the system according to the present invention;

FIGS. 5A to 5D are graphs for illustrating switching of a chirp parameter in the MZ modulator;

FIG. 15 is a graph showing the relation between attenuation and applied voltage;

DETAILED DESCRIPTION OF THE PREFERRED THE EMBODIMENTS

Figure 2:
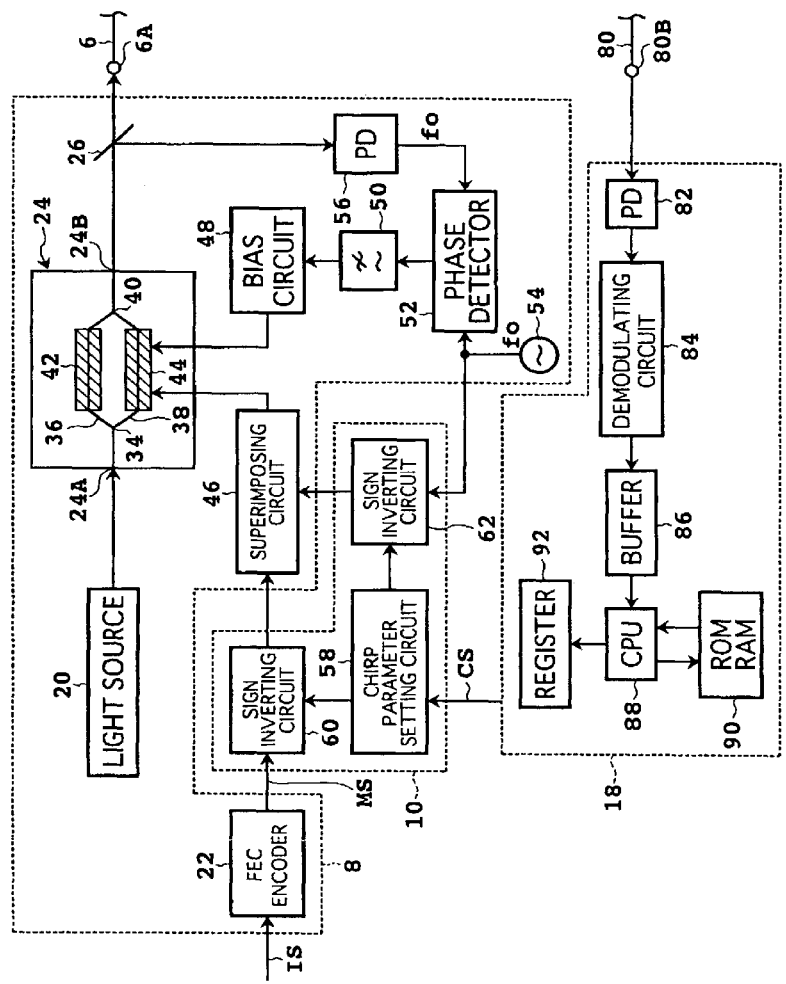
FIG. 2 is a block diagram showing a preferred embodiment of a first terminal device shown in FIG. 1.

Some preferred embodiments of the present invention will now be described in detail with reference to the attached drawings. Throughout the drawings, substantially the same parts are denoted by the same reference numerals.

FIG. 1 is a block diagram showing a preferred embodiment of the system according to the present invention. This system includes a first terminal device 2, a second terminal device 4, and an optical fiber transmission line 6 connecting the first and second terminal devices 2 and 4. The first terminal device 2 includes an optical transmitter 8 for outputting an optical signal having a chirping determined by a chirp parameter to the optical fiber transmission line 6 from its first end 6A, and a control unit 10 for controlling the chirp parameter in the optical transmitter 8 according to a control signal CS. The second terminal device 4 includes an optical receiver 12 for converting the optical signal transmitted by the optical fiber transmission line 6 into an electrical signal, and a monitor unit 14 for detecting a bit error of the electrical signal output from the optical receiver 12. The second terminal device 4 further includes a transmitting unit 16 for transmitting supervisory information on the bit error detected to the first terminal device 2.

The first terminal device 2 further includes a receiving unit 18 for receiving the supervisory information transmitted from the second terminal device 4. The receiving unit 18 generates the control signal CS to be supplied to the control unit 10 so that the bit error detected in the monitor unit 14 is reduced, for example. The transmission of the supervisory information from the transmitting unit 16 to the receiving unit 18 may be performed by using the optical fiber transmission line 6, by using another optical fiber transmission line not shown, or by means of an electrical circuit or a wireless circuit.

FIG. 2 is a block diagram showing a preferred embodiment of the first terminal device 2 shown in FIG. 1. The optical transmitter 8 includes a light source 20 such as a laser diode for outputting continuous wave (CW) light, an FEC (Forward Error Correction) encoder 22 for generating a modulating signal MS by adding a redundancy code to a transmission data code of an input signal IS, and a Mach-Zehnder optical modulator (MZ modulator) 24 for modulating the CW light output from the light source 20 according to the modulating signal MS to generate an optical signal. The optical signal thus generated is output through an optical coupler 26 to the optical fiber transmission line 6.

Figure 3:
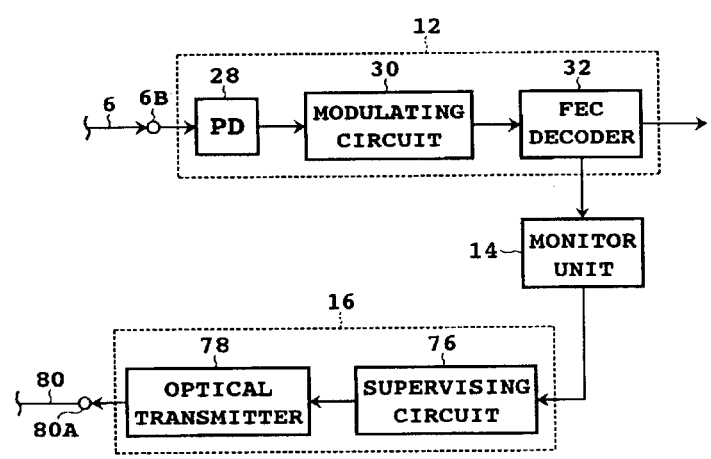
FIG. 3 is a block diagram showing a preferred embodiment of a second terminal device shown in FIG. 1.

FIG. 3 is a block diagram showing a preferred embodiment of the second terminal device 4 shown in FIG. 1. The optical receiver 12 includes a photodetector (PD) 28 such as a photodiode for converting the optical signal transmitted by the optical fiber transmission line 6 into an electrical signal, a demodulating circuit 30 for performing demodulation according to the electrical signal output from the photodetector 28, and an FEC decoder 32 for correcting a bit error of the electrical signal output from the demodulating circuit 30 according to the redundancy code added by the FEC encoder 22 (see FIG. 2). Accordingly, the monitor unit 14 can detect the bit error by counting the number of corrections of the bit error in the FEC decoder 32.

The input signal IS input into the FEC encoder 22 and the electrical signal output from the FEC decoder 32 are comply with synchronous digital hierarchy (SDH). The SDH defines an interface for effectively multiplexing various high-speed services or existing low-speed services, and it was standardized at CCITT (presently, ITU-T) on November, 1988. The multiplexing is characterized in that a fundamental rate of 155.52 Mb/s (which is called STM-1 level) is adopted and an integral multiple of this rate, i.e., N×155.52 Mb/s, is used as a transmission rate, provided that the frequencies in the network are synchronized. At present, N=1, 4, and 16, i.e., 155.52 Mb/s (STM-1), 622.08 Mb/s (STM-4), and 2.48832 Gb/s (STM-16) are defined.

The FEC decoder 32 (see FIG. 3) outputs transmission data whose bit error has been corrected and also outputs data reflecting the number of corrections of the bit error. Accordingly, the monitor unit 14 counts the number of corrections of the bit error in the FEC decoder 32, thereby easily detecting the degree of the bit error. The number of corrections detected in the monitor unit 14 is transmitted as supervisory information from the transmitting unit 16 to the first terminal device 2.

The configuration and operation of the optical transmitter 8 and the control unit 10 will now be described in detail with reference to FIG. 2.

The MZ modulator 24 includes an input port 24A optically connected to the light source 20, an output port 24B optically connected to the optical coupler 26, a pair of optical paths 36 and 38 optically coupled through a Y branch 34 to the input port 24A, and another Y branch 40 for optically coupling the optical paths 36 and 38 to the output port 24B. The Y branches 34 and 40 and the optical paths 36 and 38 may be obtained by performing thermal diffusion of Ti or the like with a given pattern on a dielectric substrate formed of $LiNbO_3$ or the like to thereby form an optical waveguide structure. A ground electrode 42 and a signal electrode 44 are provided on the optical paths 36 and 38, respectively, to apply an electric field to the optical paths 36 and 38. The signal electrode 44 is provided as a traveling-wave type, for example.

The CW light supplied from the light source 20 to the input port 24A is first branched at the Y branch 34 into first and second branch beams having the same power. The first and second branch beams propagate in the optical paths 36 and 38, respectively, and then joined together at the Y branch 40. The electric field generated between the ground electrode 42 and the signal electrode 44 changes the refractive indices of the optical paths 36 and 38 in opposite directions, thereby producing a phase difference between the first and second branch beams. Then, the first and second branch beams different in phase interfere with each other at the Y branch 40, so that an optical signal intensity-modulated according to the modulating signal MS is output from the output port 24B.

To drive the MZ modulator 24 and stabilize its operating point, the optical transmitter 8 further includes a superimposing circuit 46, a bias circuit 48, a low-pass filter 50, a phase detector 52, an oscillator 54, and a photodetector 56. Further, the control circuit 10 in this preferred embodiment includes a chirp parameter setting circuit 58 and two sign inverting circuits 60 and 62.

A low-frequency signal having a frequency $f_0$ output from the oscillator 54 is used to stabilize the operating point. The low-frequency signal is supplied through the sign inverting circuit 62 to the superimposing circuit 46. The modulating signal MS from the FEC encoder 22 is supplied through the sign inverting circuit 60 to the superimposing circuit 46. The low-frequency signal is superimposed on the modulating signal MS in the superimposing circuit 46, and a resultant superimposed signal is supplied to the signal electrode 44. The superimposing circuit 46 may be configured of a variable-gain amplifier and a capacitor for AC-connecting this amplifier to the signal electrode 44. The sign inverting circuits 60 and 62 are controlled by the chirp parameter setting circuit 58. This control will be hereinafter described in detail.

A bias voltage controlled so as to stabilize the operating point is supplied from the bias circuit 48 to the signal electrode 44. For this control, a part of the optical signal output from the output port 24B of the MZ modulator 24 is converted into an electrical signal by the photodetector 56. This electrical signal may include a low-frequency component having a frequency $f_0$. The phase detector 52 is provided as a synchronous detector circuit. The phase detector 52 compares the phase of the low-frequency signal from the oscillator 54 and the phase of the low-frequency component from the photodetector 56. The result of this phase comparison appears in a DC component of the output signal from the phase detector 52. Accordingly, the DC component is extracted by the low-pass filter 50 and then fed back to the bias circuit 48. In this feedback loop, the bias circuit 48 controls the bias voltage so that the low-frequency component from the photodetector 56 is minimized.

Figure 4:
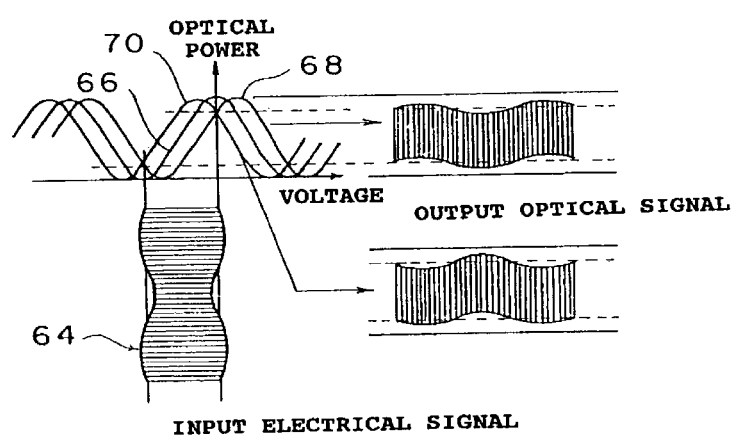
FIG. 4 is a diagram for illustrating the principle of stabilization of the operating point of a Mach-Zehnder optical modulator (MZ modulator) shown in FIG. 2.

Referring to FIG. 4, there is shown the principle of stabilization of the operating point of the MZ modulator 24 shown in FIG. 2. Reference numeral 64 denotes a waveform of an electrical signal input to the MZ modulator 24. An optimum operating point of the MZ modulator 24 is determined by an operating characteristic curve in which the high and low levels of the input electrical signal 64 give maximum and minimum output signal powers, respectively. The operating characteristic curve is given by a sine curve showing the relation between optical power and applied voltage. A shift of the operating characteristic curve along the voltage axis is referred to as an operating point drift.

When the operating characteristic curve 66 is shifted to a curve 68 or 70 because of temperature fluctuations or the like, a low-frequency component appears in the output optical signal, and the phase of the low-frequency component reflects a direction of shifting of the curve 66. That is, the phases of the envelopes of the output optical signals given by the operating characteristic curves 68 and 70 are different by 180° from each other. Accordingly, the operating point of the MZ modulator 24 can be stabilized by performing synchronous detection by use of the phase detector 52 as shown in FIG. 2.

There will now be described switching of the chirp parameter by use of the sign inverting circuits 60 and 62 with reference to FIGS. 5A to 5D. In the MZ modulator 24, optical switching by interference is performed, and it is therefore possible to perform prechirping by utilizing wavelength fluctuations (chirping) occurring substantially due to interference. The prechirping is a method for suppressing a degradation in transmission waveform due to chromatic dispersion and nonlinear effects in an optical fiber transmission line by preliminarily giving wavelength (frequency) fluctuations within one pulse of an optical signal to be transmitted.

There are a plurality of operating points that may become stable points, because the operating characteristic curve of the MZ modulator 24 is given as a sine curve.

Referring to FIG. 5A, there is shown an operating characteristic curve of the MZ modulator 24. In the case that a positive pulse as shown in the left graph of FIG. 5B is given as the applied voltage by using a region 72 in the vicinity of one stable point Vb1, the optical power (P) increases with an increase in the applied voltage (V) in the region 72. Accordingly, an optical pulse is output with the same polarity as that of the voltage pulse, as shown in the left graph of FIG. 5C. In this case, the wavelengths at the rising portion of the optical pulse are shorter than the average value, and the wavelengths at the falling portion of the optical pulse are longer than the average value as shown in the left graph of FIG. 5D. That is, the wavelength shifts from shorter wavelengths (blue side) toward longer wavelengths (red side) with respect to time (t) in one optical pulse. This phenomenon is referred to as red shift.

Conversely, in the case that a negative voltage pulse as shown in the right graph of FIG. 5B is given by using a region 74 in the vicinity of another stable point Vb2, the optical power (P) decreases with an increase in the applied voltage (V) in the region 74. Accordingly, an optical pulse is output with a polarity opposite to that of the voltage pulse, as shown in the right graph of FIG. 5C. In this case, the wavelength shifts toward longer wavelengths at the rising portion of the optical pulse and shifts toward shorter wavelengths at the falling portion of the optical pulse as shown in the right graph of FIG. 5D. That is, the wavelength shifts from longer wavelengths (red side) toward shorter wavelengths (blue side) with respect to time (t) in one optical pulse. This phenomenon is referred to as blue shift.

The chirp parameter α of an optical pulse is given by the following expression.

$$\alpha = 2(d\phi/dt)/(dS/dt)/S$$

where $\phi$ is the optical phase and S is the optical intensity. In the case of red shift, the chirp parameter α takes on positive values, whereas in the case of blue shift, the chirp parameter α takes on negative values.

When the wavelength of an optical signal is shorter than the zero-dispersion wavelength of an optical fiber used as a transmission line, that is, falls in a region of normal dispersion, longer-wavelength light travels faster than shorter-wavelength light in the optical fiber. Accordingly, by preliminarily giving a prechirping of $0<\alpha$ (red shift), pulse compression occurs to obtain a large eye opening. Conversely, when the wavelength of an optical signal falls in a region of anomalous dispersion, shorter-wavelength light travels faster than longer-wavelength light. Accordingly, by preliminarily giving a prechirping of $\alpha<0$ (blue shift), a large eye opening can be obtained. Further, by adjusting the value of the chirp parameter α according to the conditions of a transmission line, the transmission conditions of the system as a whole can be optimized.

In the preferred embodiment shown in FIG. 2, the chirp parameter setting circuit 58 operates to switch the stable points Vb1 and Vb2, thereby switching the sign of the chirp parameter α.

More specifically, the sign inverting circuit 62 is provided to invert the polarity of the low-frequency signal to be supplied from the oscillator 54 to the superimposing circuit 46. When the polarity of the low-frequency signal is switched by the sign inverting circuit 62, the phase of the low-frequency signal to be supplied to the superimposing circuit 46 is inverted. As a result, the direction of control in the feedback loop including the photodetector 56 is reversed. For example, in the case that the stable point before switching is Vb1 shown in FIG. 5A, the stable point after switching becomes Vb2. As a result, the sign of the chirp parameter α is inverted. In this case, the optical power increases with an increase in the applied voltage at the original stable point Vb1, whereas the optical power decreases with an increase in the applied voltage at the stable point Vb2 after switching. In this respect, the sign inverting circuit 60 for the modulating signal MS is adopted to maintain the relation between the high and low levels of the modulating signal MS output from the FEC encoder 22 identical with the relation between the high and low levels of the optical signal output from the MZ modulator 24.

While the sign inverting circuit 62 is provided between the oscillator 54 and the superimposing circuit 46 in the preferred embodiment shown in FIG. 2, the sign inverting circuit 62 may be provided between the oscillator 54 and the phase detector 52 or between the photodetector 56 and the phase detector 52.

The count of corrections of bit error (which will be hereinafter referred to as "error count") in the FEC decoder 32 as detected in the monitor unit 14 shown in FIG. 3 is supplied to the transmitting unit 16. The transmitting unit 16 includes a supervising circuit 76 related with supervisory information containing the error count from the monitor unit 14 and an optical transmitter 78 for generating an optical signal based on the supervisory information to transmit the supervisory information to the first terminal device 2 (see FIGS. 1 and 2).

In this preferred embodiment, the optical signal output from the optical transmitter 78 is supplied to an optical fiber transmission line 80 from its first end 80A. The optical fiber transmission line 80 is a channel different from that of the optical fiber transmission line 6.

As shown in FIG. 2, the optical signal output from the transmitting unit 16 and transmitted by the optical fiber transmission line 80 is supplied to the receiving unit 18 from a second end 80B of the optical fiber transmission line 80. The receiving unit 18 includes a photodetector 82 for converting the optical signal from the optical fiber transmission line 80 into an electrical signal and a demodulating circuit 84 for regenerating the error count according to the electrical signal output from the photodetector 82. The error count is supplied through a buffer 86 to a CPU 88. A memory unit 90 is connected to the CPU 88. The memory unit 90 includes a ROM (read-only memory) preliminarily storing a program and data for executing the program, and a RAM (random access memory) for temporarily storing a result of computation by the CPU 88. The result of computation by the CPU 88 is supplied as the control signal CS through a register 92 to the chirp parameter setting circuit 58 of the control unit 10.

The operation of the device shown in FIG. 2 will now be described with reference to the flowchart shown in FIG. 6. In step 102, the chirp parameter α is set to a positive value, so as to output an optical signal having a red-shift chirping from the optical transmitter 8. In step 104, an error count EC1 at this time is detected, and its detected value is stored into the memory unit 90. In step 106, the chirp parameter α is set to a negative value, so as to output an optical signal having a blue-shift chirping from the optical transmitter 8. In step 108, an error count EC2 at this time is detected, and its detected value is stored into the memory unit 90.

In step 110, the error counts EC1 and EC2 stored in the memory unit 90 are compared with each other. If the error count EC2 is smaller than the error count EC1, this flow is ended. That is, the condition of outputting an optical signal having a blue-shift chirping from the optical transmitter 8 is fixed. Conversely, if the error count EC2 is greater than or equal to the error count EC1 in the decision of step 110, the program proceeds to step 112. In step 112, the chirp parameter a is set to a positive value again, and this flow is then ended, so that the condition of outputting an optical signal having a red-shift chirping from the optical transmitter 8 is fixed.

Figure 6:
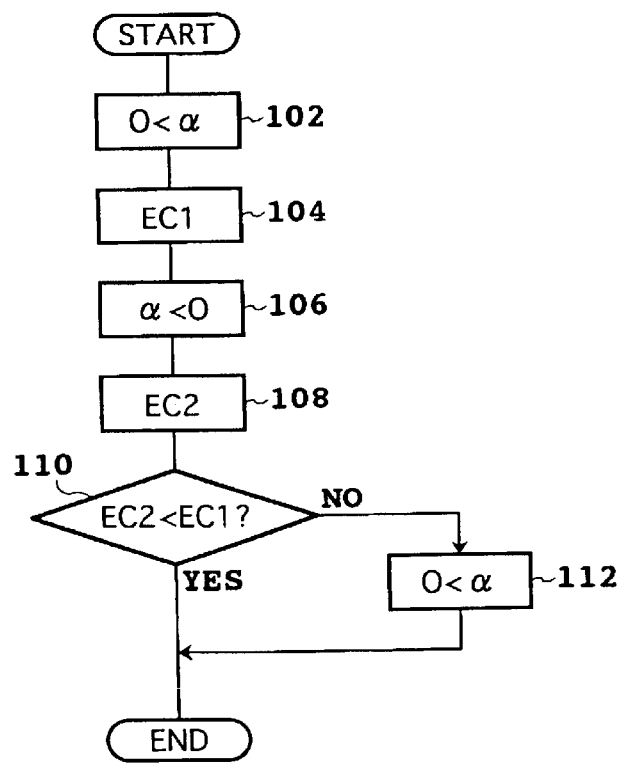
FIG. 6 is a flowchart showing the operation of the device shown in FIG. 2.

The operation shown in FIG. 6 may be performed at initial starting of the system or at restarting of the system when changing the transmission route, changing the optical transmitter, or trouble-shooting.

While the sign of the chirp parameter is automatically switched by adopting the CPU 88 in this preferred embodiment, the operator may manually switch the sign of the chirp parameter according to the error count detected.

The reason why an optical signal having a red-shift chirping is output from the optical transmitter 8 in the case that the error counts EC1 and EC2 are equal to each other in the operation shown in FIG. 6 is that the need for logic inversion in the sign inverting circuits 60 and 62 (see FIG.

2) can be eliminated by applying the bias Vb1 to obtain a red-shift chirping in the operation shown in FIGS. 5A to 5D, for example, thereby obtaining an advantage in operating the device.

While the optical fiber transmission line 80 (see FIGS. 2 and 3) is used specially to transmit the supervisory information on the error count detected in the monitor unit 14 from the second terminal device 4 to the first terminal device 2 in this preferred embodiment, a main signal for general use may be transmitted by the optical fiber transmission line 80. In this case, the supervisory information on the error count may be included in OH (overhead) information of the main signal.

Particularly in this preferred embodiment, bit error correction is performed by using the FEC encoder 22 and the FEC decoder 32, so that a bit error rate (BER) can be improved. For example, by using a Reed-Solomon code to perform error correction, the BER can be improved in such a manner that BERs of $10^{-3}$, $10^{-4}$, and $10^{-5}$ for an original signal are decreased to BERs of $10^{-5}$, $10^{-13}$, and $10^{-21}$ after correction, respectively.

Figure 7:
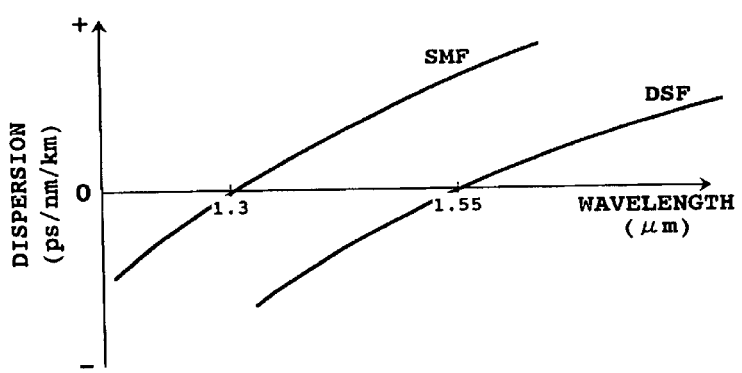
FIG. 7 is a graph showing dispersion characteristics of optical fibers.

FIG. 7 is a graph showing dispersion characteristics of optical fibers usable as the optical fiber transmission line 6. In FIG. 7, the vertical axis represents dispersion (ps/nm/km) and the horizontal axis represents wavelength ($\mu$m).

In the case that a single-mode fiber (SMF) for general use is used as the optical fiber transmission line 6, the zero-dispersion wavelength of the SMF is about 1.3 $\mu$m. In this case, the dispersion falls in a region of anomalous dispersion for an optical signal having a wavelength longer than the zero-dispersion wavelength, and has a positive value. Conversely, the dispersion falls in a region of normal dispersion for an optical signal having a wavelength shorter than the zero-dispersion wavelength, and has a negative value. In the case of using an SMF as the optical fiber transmission line 6, the wavelength of an optical signal is set to fall in a 1.55 $\mu$m band (e.g., 1.50 to 1.60 $\mu$m) giving a minimum loss in the SMF. Accordingly, the dispersion for the optical signal falls always in a region of anomalous dispersion.

In the case that a dispersion shifted fiber (DSF) is used as the optical fiber transmission line 6, the zero-dispersion wavelength of the DSF is about 1.55 $\mu$m. Also in this case, the dispersion falls in a region of anomalous dispersion for an optical signal having a wavelength longer than the zero-dispersion wavelength, and has a positive value. Conversely, the dispersion falls in a region of normal dispersion for an optical signal having a wavelength shorter than the zero-dispersion wavelength, and has a negative value. Because the wavelength giving a minimum loss in the DSF is also equal to about 1.55 $\mu$m, the wavelength of an optical signal is set to fall in the 1.55 $\mu$m band. Accordingly, whether the dispersion in the DSF falls in a region of anomalous dispersion or in a region of normal dispersion is determined according to the correlation between the oscillation wavelength of the laser diode used as the light source 20 (see FIG. 2) and the actual zero-dispersion wavelength of the DSF.

There will now be described a transmittable distance in the case of using each of a DSF and an SMF as the optical fiber transmission line 6.

Figure 8A:
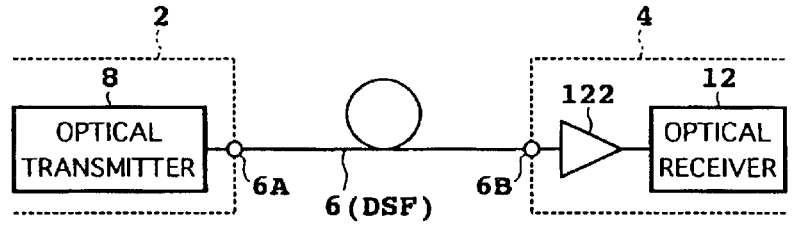
FIGS. 8A to 8C are diagrams for illustrating a transmittable distance in the case of using a dispersion shifted fiber (DSF) and a preamplifier.

Referring to FIG. 8A, there is shown an essential part of the system shown in FIG. 1 in the case of using a DSF as the optical fiber transmission line 6. In this case, an optical amplifier 122 is additionally provided as a preamplifier in the second terminal device 4 in order to enhance a receiver sensitivity. The optical amplifier 122 is optically connected between the second end 6B of the optical fiber transmission line 6 and the optical receiver 12. An erbium doped fiber amplifier (EDFA) may be used as the optical amplifier 122.

Figure 8B:
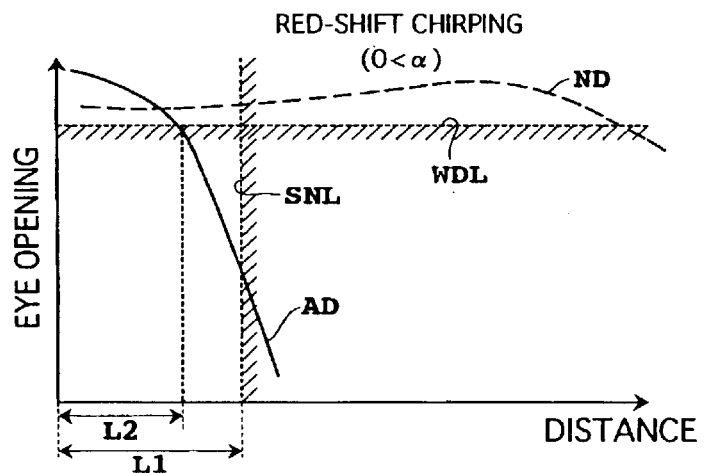

Referring to FIG. 8B, there is shown a transmittable distance in the case that the optical signal to be output from the optical transmitter 8 has a red-shift chirping (0<α). In FIG. 8B, the vertical axis represents the eye opening of an equivalent waveform in the optical receiver 12, and the horizontal axis represents the transmission distance. Reference symbol SNL denotes an SN limit to the transmission distance, and WDL denotes a waveform degradation limit to the eye opening. Further, reference symbol ND means that the dispersion in the optical fiber transmission line 6 is in a region of normal dispersion, and AD means that the dispersion in the optical fiber transmission line 6 is in a region of anomalous dispersion.

In the case that the optical signal has a red-shift chirping, the waveform or pulse width of the optical signal is first compressed and thereafter broadened in the region of normal dispersion, so that the distance at which the eye opening degradation becomes lower than the WDL is sufficiently longer than the SNL. Accordingly, the transmittable distance L1 in this case is given by the SNL.

In the region of anomalous dispersion, the waveform or pulse width of the optical signal having a red-shift chirping continues to be broadened. Accordingly, the transmittable distance L2 is given by the distance at which the eye opening degradation becomes lower than the WDL. The transmittable distance L2 is shorter than L1 in this case.

Figure 8C:
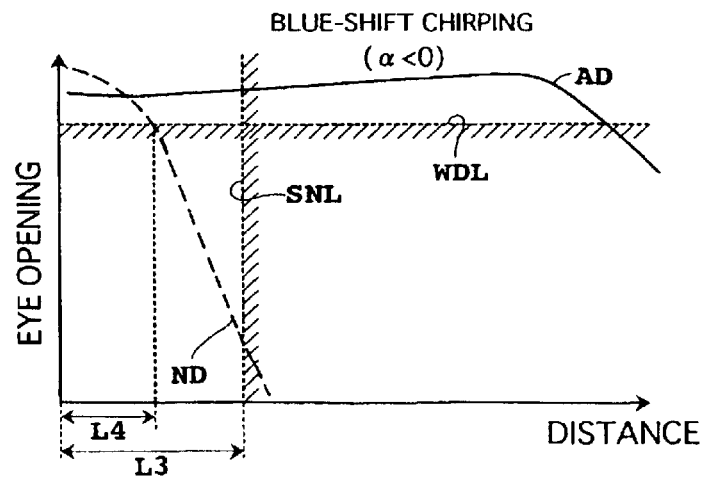

Referring to FIG. 8C, there is shown a transmittable distance in the case that the optical signal to be output from the optical transmitter 8 has a blue-shift chirping (α<0). Conversely to the above case of the red-shift chirping, the transmittable distance L3 in the region of anomalous dispersion is given by the SNL, and the transmittable distance L4 in the region of normal dispersion is given by the distance at which the eye opening degradation becomes lower than the WDL.

In the preferred embodiment shown in FIGS. 2 and 3, the chirp parameter setting circuit 58 can set the chirp parameter according to the control signal CS so that the error count in the second terminal device 4 is reduced. Accordingly, the transmittable distance can be set to a longer distance as shown by L1 or L3 in each of the regions of normal dispersion and anomalous dispersion.

Figure 9A:
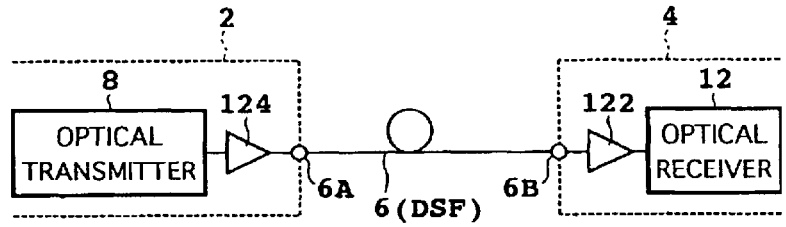
FIGS. 9A to 9C are diagrams for illustrating a transmittable distance in the case of using a DSF, a postamplifier, and a preamplifier.

In contrast with the system shown in FIG. 8A, the system shown in FIG. 9A is characterized in that the first terminal device 2 further includes an optical amplifier 124 used as a postamplifier. An EDFA may be used as the optical amplifier 124. The optical amplifier 124 is optically connected between the optical transmitter 8 and the first end 6A of the optical fiber transmission line 6.

Figure 9B:
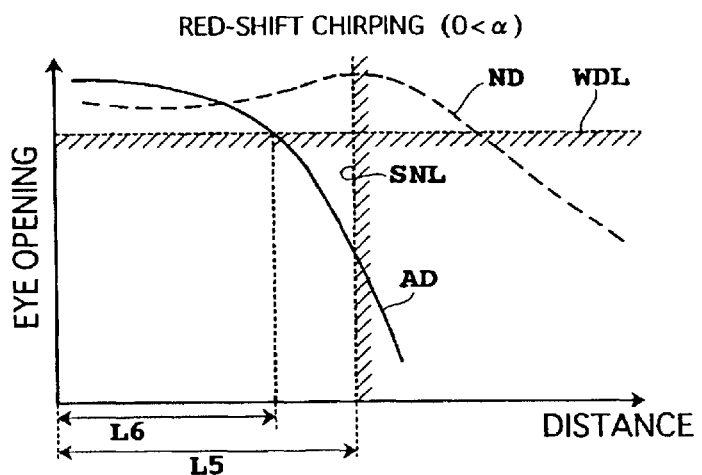
Figure 9C:
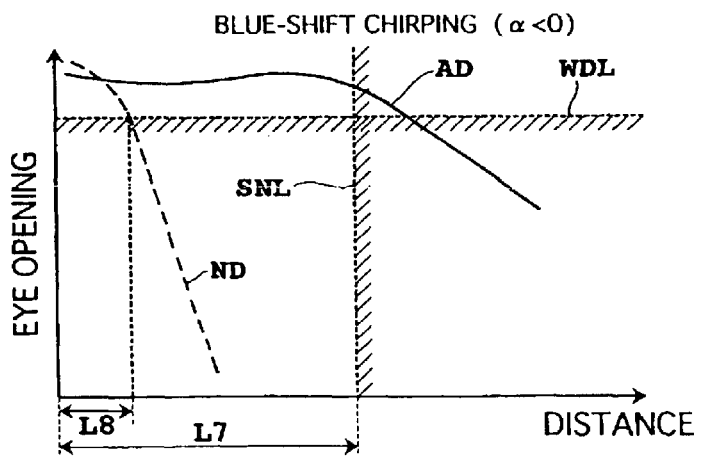

As shown in FIGS. 9B and 9C, the SNL is increased and the nonlinear effect (SPM) occurring in the optical fiber transmission line 6 is also increased, because the power of the optical signal to be output to the optical fiber transmission line 6 is increased. FIGS. 9B and 9C correspond to FIGS. 8B and 8C, respectively.

In the case that the optical signal to be output from the optical transmitter 8 has a red-shift chirping (0<α) as shown in FIG. 9B, the transmittable distance L5 in the region of normal dispersion is given by the SNL, and the transmittable distance L6 in the region of anomalous dispersion is given by the distance at which the eye opening degradation becomes lower than the WDL.

In the case that the optical signal to be output from the optical transmitter 8 has a blue-shift chirping (α<0) as shown in FIG. 9C, the transmittable distance L7 in the region of anomalous dispersion is given by the SNL, and the transmittable distance L8 in the region of normal dispersion is given by the distance at which the eye opening degradation becomes lower than the WDL.

Also in the system shown in FIG. 9A, the transmittable distance can be set always to a longer distance as shown by L5 or L7 by switching the chirp parameter as in the system shown in FIG. 8A.

Figure 10A:
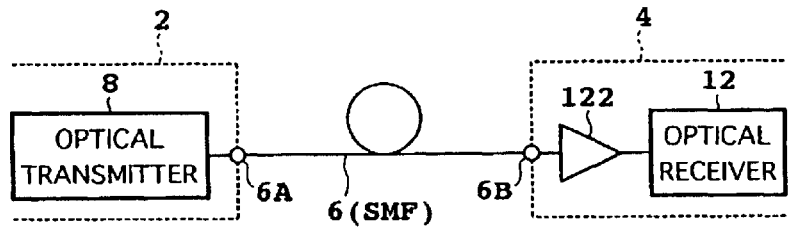
FIGS. 10A to 10C are diagrams for illustrating a transmittable distance in the case of using a single-mode fiber (SMF) and a preamplifier.
Figure 10B:
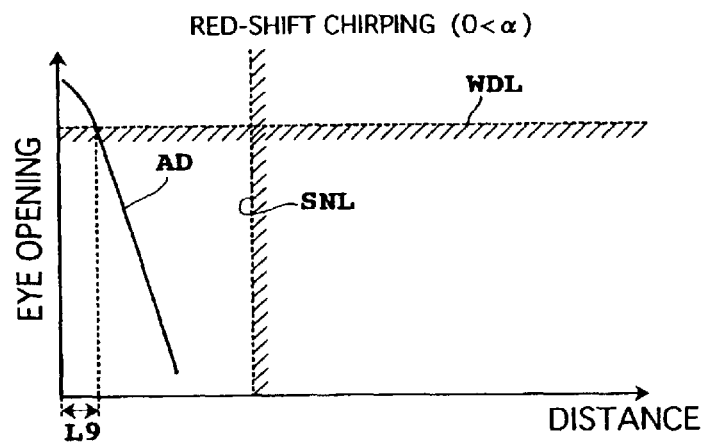
Figure 10C:
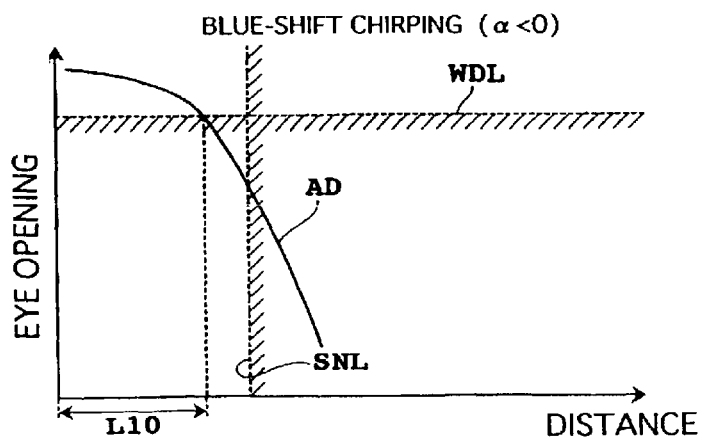

In contrast with the system shown in FIG. 8A, the system shown in FIG. 10A is characterized in that an SMF is used as the optical fiber transmission line 6. In the case that an SMF is used as the optical fiber transmission line 6, the zero-dispersion wavelength of the SMF is about 1.3 μm and the wavelength of the optical signal to be output from the optical transmitter 8 falls in a 1.55 μm band as mentioned previously, so that only a region of anomalous dispersion is given. Accordingly, in the case that the optical signal to be output from the optical transmitter 8 has a red-shift chirping ($0<\alpha$), the transmittable distance L9 becomes very short as shown in FIG. 10B. In the case that the optical signal to be output from the optical transmitter 8 has a blue-shift chirping ($\alpha<0$), the transmittable distance L10 is longer than L9 by an amount produced in the case that the waveform or pulse width of the optical signal is compressed in the optical fiber line 6.

In the system shown in FIG. 10A, the transmittable distance can be increased as shown by L10 by setting the chirp parameter $\alpha$ to a negative value so as to obtain a blue-shift chirping.

Figure 11A:
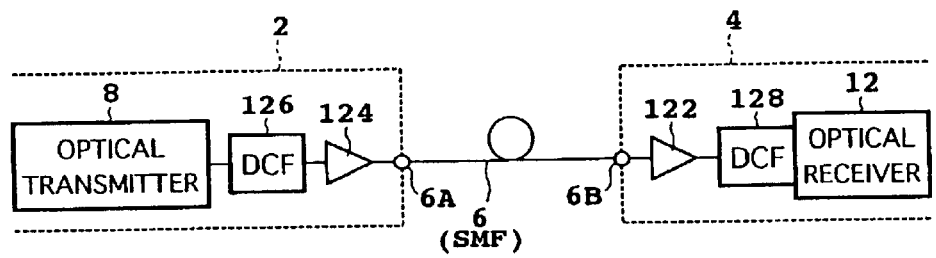
FIGS. 11A to 11C are diagrams for illustrating a transmittable distance in the case of using an SMF, a postamplifier, and a preamplifier.

In contrast with the system shown in FIG. 9A, the system shown in FIG. 11A is characterized in that an SMF is used as the optical fiber transmission line 6. In this system, dispersion compensating fibers (DCF) 126 and 128 are adopted to compensate for chromatic dispersion in the optical fiber transmission line 6, in view of the fact that the dispersion of an SMF in a 1.55 μm band is relatively large. The DCF 126 is optically connected between the optical transmitter 8 and the optical amplifier 124, and the DCF 128 is optically connected between the optical amplifier 122 and the optical receiver 12.

An optical fiber having a dispersion (ps/nm/km) sufficiently larger than the dispersion of an SMF may be used as each of the DCFS 126 and 128, so as to suppress losses. The dispersion in each DCF falls in a region of normal dispersion, thereby performing dispersion compensation.

Figure 11B:
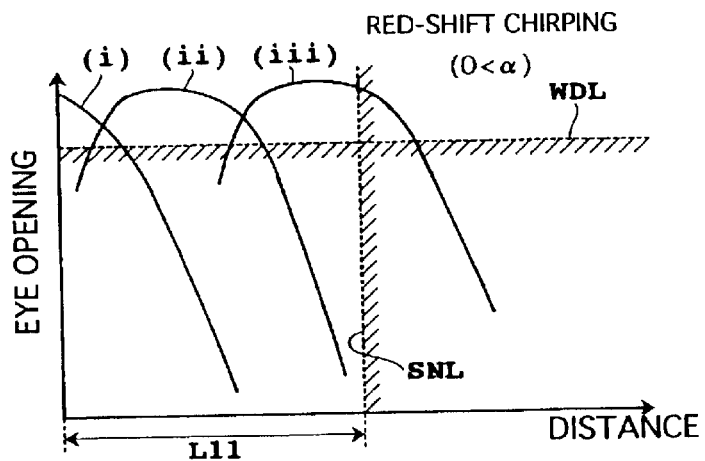
Figure 11C:
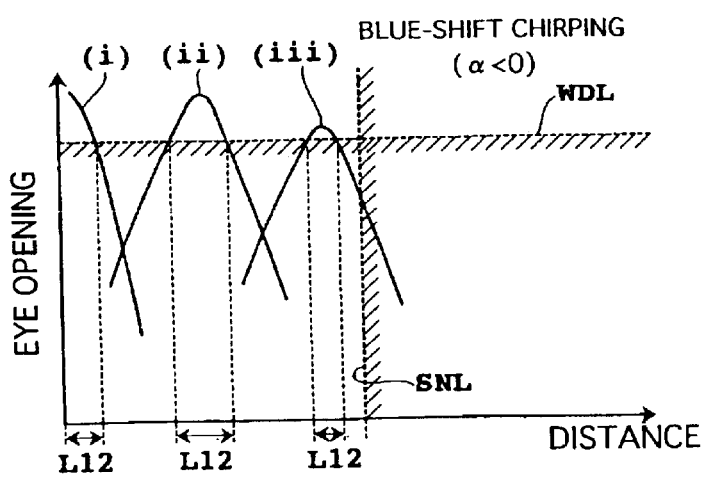

In the case that the DCFS 126 and 128 are used, the characteristic curve becomes three different characteristic curves as shown by (i), (ii), and (iii) in FIGS. 11B and 11C according to the dispersion induced by these DCFS.

In the case that the optical signal to be output from the optical transmitter 8 has a red-shift chirping ($0<\alpha$) as shown in FIG. 11B, the three characteristic curves intersect each other on the upper side of the WDL. Accordingly, the transmittable distance L11 is given by the SNL.

In the case that the optical signal to be output from the optical transmitter 8 has a blue-shift chirping ($\alpha<0$) as shown in FIG. 11C, the three characteristic curves intersect each other on the lower side of the WDL. Accordingly, the transmittable distance is given by three limited ranges as shown by L12.

In the system shown in FIG. 11A, the transmittable distance can be increased or the range of the transmittable distance can be widened by setting the chirp parameter $\alpha$ to a positive value.

Figure 12:
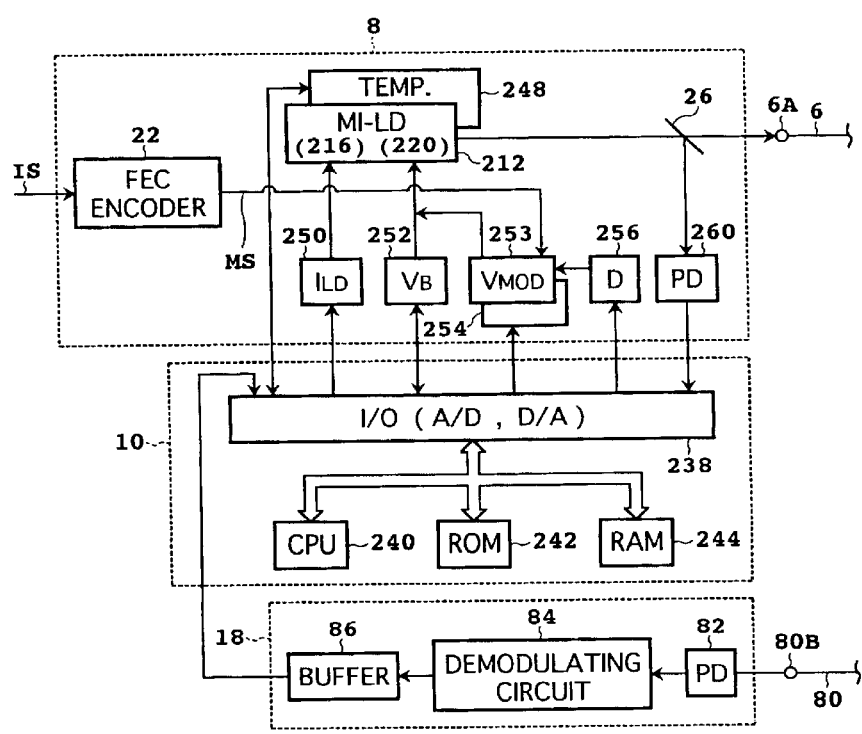
FIG. 12 is a block diagram showing another preferred embodiment of the first terminal device shown in FIG. 1.

FIG. 12 is a block diagram showing another preferred embodiment of the first terminal device 2 shown in FIG. 1. This preferred embodiment is characterized in that the optical transmitter 8 includes a modulator integrated laser diode (MI-LD) 212. The MI-LD 212 outputs an optical signal obtained by modulation according to a modulating signal MS from an FEC encoder 22. The optical signal is then supplied through an optical coupler 26 to the optical fiber transmission line 6 from its first end 6A.

In this preferred embodiment, the control unit 10 controls or optimizes the operating conditions of the MI-LD 212, thereby adjusting the chirp parameter a of the optical signal to be output from the MI-LD 212 to an optimum value.

Figure 13:
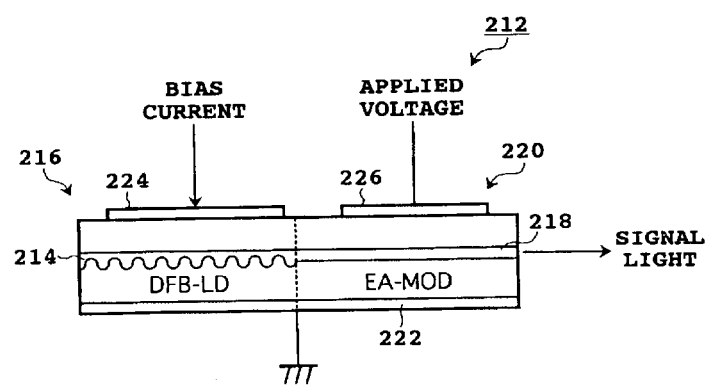
FIG. 13 is a schematic view showing the configuration of a modulator integrated laser diode (MI-LD) shown in FIG. 12.

Referring to FIG. 13, there is shown a configuration of the MI-LD 212 shown in FIG. 12. The MI-LD 212 may be provided as a semiconductor chip having a directly coupled waveguide structure including a multiquantum well (MQW) layer of GaInAs, for example. The MI-LD 212 has an integrated structure consisting of a distributed feedback (DFB) laser diode (LD) 216 having a light emitting layer (active layer) 214 as a light source for generating CW light and of an electroabsorption optical modulator (EA modulator) 220 having an absorbing layer 218. The active layer 214 and the absorbing layer 218 are monolithically directly coupled together. Reference numeral 222 denotes a common electrode for the LD 216 and the EA modulator 220. The LD 216 has an electrode 224 for receiving a bias current, and the EA modulator 220 has an electrode 226 for an applied voltage.

Because the MI-LD 212 has the active layer 214 and the absorbing layer 218 monolithically directly coupled, the CW light generated from the active layer 214 is efficiently introduced into the absorbing layer 218. Accordingly, high output can be obtained from the optical transmitter 8. Further, because the MI-LD 212 is provided as a small semiconductor chip, the optical transmitter 8 can be reduced in size.

Figure 14:
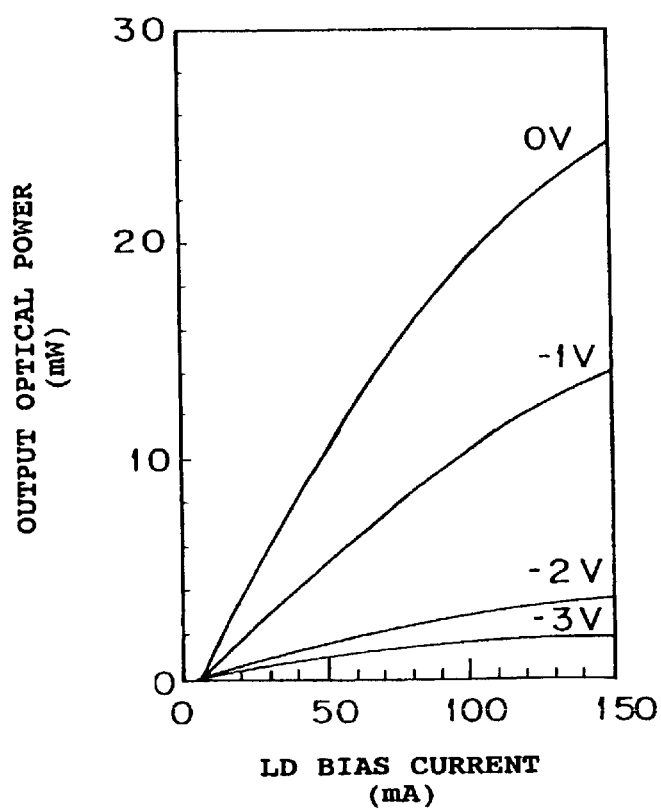
FIG. 14 is a graph showing the relation between output optical power and LD bias current in the MI-LD.

FIG. 14 is a graph showing an example of the static characteristic of the MI-LD 212. In FIG. 14, the vertical axis represents output optical power (mW) from the EA modulator 212, and the horizontal axis represents bias current (mA) for the LD 216. The static characteristic shown is a relation between the output optical power and the bias current under the conditions where the electrode 222 is grounded and the potential at the electrode 226 is set to 0 V, −1 V, −2 V, and −3 V. As understood from the characteristic shown, an optical pulse having an extinction ratio of about 12 dB can be obtained as the optical signal by driving the EA modulator 212 with a pulse shape having a high level of 0 V and a low level of −3 V, for example.

FIG. 15 is a graph showing a relation between attenuation (dB) and applied voltage (V) in the MI-LD 212. It is to be noted that the vertical axis in FIG. 15 corresponds to a common logarithm of output optical power from the MI-LD 212, because the attenuation is expressed in dB. The EA modulator 220 is driven by a reverse bias, and a negative voltage is therefore applied to the electrode 226. FIG. 15 shows an attenuation-applied voltage characteristic under the condition that the bias current for the LD 216 is 100 mA, and it is apparent from this characteristic that the attenuation increases with an increase in absolute value of the applied voltage to the EA modulator 220.

Figure 16:
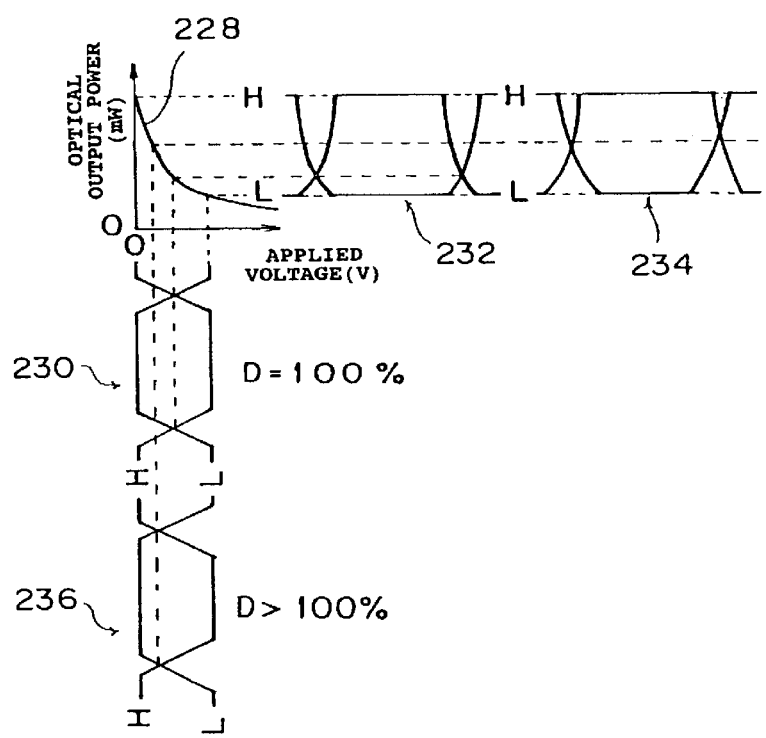
FIG. 16 is a diagram showing an operating characteristic of the MI-LD.

FIG. 16 is a diagram showing an operating characteristic of the MI-LD 212. Reference numeral 228 denotes a characteristic curve showing a relation between output optical power (mW) and applied voltage (V) for the MI-LD 212. It is to be noted that the output optical power along the vertical axis in FIG. 16 is not expressed in dB and that the shape of the characteristic curve 228 is therefore different from the shape of the curve shown in FIG. 15. The characteristic curve 228 has a tendency that the optical output power decreases with an increase in absolute value of the applied voltage.

In the case that the duty D of the modulating signal MS is 100% as shown by reference numeral 230, a cross point in the waveform of an optical signal is present nearer to the low level (L) than the high level (H) of the optical signal as shown by reference numeral 232, because of the above-mentioned shape of the characteristic curve 228.

The condition that the duty D is 100% means that the cross point between a rising line and a falling line in a digital signal coincides with the midpoint between the high level (H) and the low level (L) of the digital signal. Further, the condition that the duty D is smaller than 100% means that the cross point is shifted from the midpoint toward the low level, whereas the condition that the duty D is greater than 100% means that the cross point is shifted from the midpoint toward the high level.

In the case that the system is designed so that the cross point in the waveform of an optical signal coincides with the midpoint, a change in duty from an electrical waveform to an optical waveform as mentioned above causes a degradation in receiver sensitivity.

To make the cross point between a rising line and a falling line in the waveform of an optical signal coincide with the midpoint between the high level and the low level of the optical signal as shown by reference numeral 234, the duty D of the modulating signal MS is preferably set greater than 100% in advance as shown by reference numeral 236.

Figure 17:
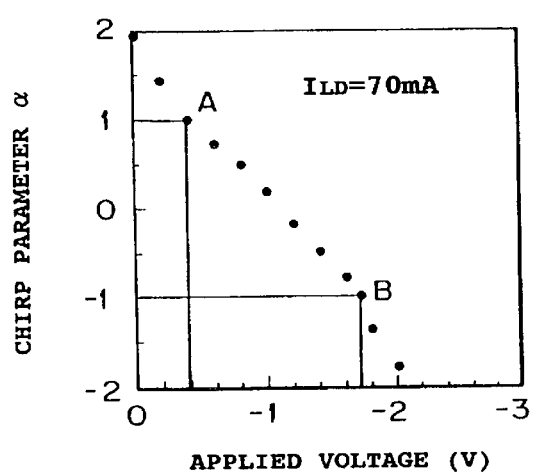
FIG. 17 is a graph showing the relation between chirp parameter and applied voltage in the MI-LD.

FIG. 17 is a graph showing measured values of the chirp parameter α of the optical signal to be output from the MI-LD 212 with respect to various values of the applied voltage (V). It is understood from FIG. 17 that the chirp parameter α can be changed from a positive value to a negative value by changing the applied voltage.

Accordingly, by changing a bias voltage $V_B$ to be applied to the EA modulator 220 as will be hereinafter described, the chirp parameter a of the optical signal can be changed continuously.

Referring back to FIG. 12, the control unit 10 includes an I/O port 238 for inputting and outputting signals which port includes an A/D converter and a D/A converter, a CPU 240 for computing target values of a bias voltage $V_B$ etc. according to a predetermined program, a ROM 242 preliminarily storing the program and data for a data table, a RAM 244 for temporarily storing a result of computation by the CPU 240, and a data bus 246 mutually connecting the I/O port 238, the CPU 240, the ROM 242, and the RAM 244.

The receiving unit 18 includes a photodetector 82, a demodulating circuit 84, and a buffer 86. The supervisory information on the error count detected in the monitor unit 14 (see FIG. 3) is transmitted from the transmitting unit 16 of the second terminal device 4 to the receiving unit 18 of the first terminal device 2, and then taken into the I/O port 238 directly from the buffer 86 of the receiving unit 18.

Accordingly, it should be understood that the control signal CS in this preferred embodiment is a signal to be transferred within the control unit 10.

The MI-LD 212 is associated with a temperature controller 248. Data on the temperature of the MI-LD 212 is taken from the temperature controller 248 through the I/O port 238 into the CPU 240. A target value of the temperature of the MI-LD 212 is supplied from the CPU 240 through the I/O port 238 to the temperature controller 248.

A bias current circuit 250 is provided to supply to the LD 216 a bias current ILD determining the amplitude of CW light generated in the LD 216. A target value of the bias current $I_{LD}$ is supplied from the CPU 240 through the I/O port 238 to the bias current circuit 250.

A bias voltage circuit 252 for the EA modulator 220 generates a bias voltage $V_B$, which is taken through the I/O port 238 into the CPU 240. The reason for inputting the bias voltage $V_B$ into the CPU 240 is to control the amplitude or the like of a modulating signal $V_{MOD}$ (obtained according to the modulating signal MS) to be superimposed on the bias voltage $V_B$, according to the bias voltage $V_B$. A target value of the bias voltage $V_B$ is supplied from the CPU 240 through the I/O port 238 to the bias voltage circuit 252. This target value is set so that the EA modulator 220 has an optimum value of the chirp parameter α.

A drive circuit 253 is provided to superimpose the modulating signal $V_{MOD}$ on the bias voltage $V_B$. The drive circuit 253 is associated with an amplitude varying circuit 254. A target value of the amplitude of the modulating signal $V_{MOD}$ is supplied from the CPU 240 through the I/O port 238 to the amplitude varying circuit 254. The amplitude varying circuit 254 controls the amplitude of the modulating signal $V_{MOD}$ to be output from the drive circuit 253 comes into coincidence with the target value.

A duty varying circuit 256 is provided to control the duty of the modulating signal $V_{MOD}$ to be output from the drive circuit 253. A target value of the duty is supplied from the CPU 240 through the I/O port 238 to the duty varying circuit 256.

A part of the optical signal output from the MI-LD 212 is extracted as monitor light by an optical coupler 26. The monitor light is then supplied to a photodetector 260. The photodetector 260 outputs an electrical signal having a level corresponding to the power of the optical signal to be output from the optical transmitter 8. This electrical signal is taken through the I/O port 238 into the CPU 240.

The operation of the optical transmitter 8 shown in FIG. 12 will now be described with reference to FIGS. 18A and 18B.

Figure 18A:
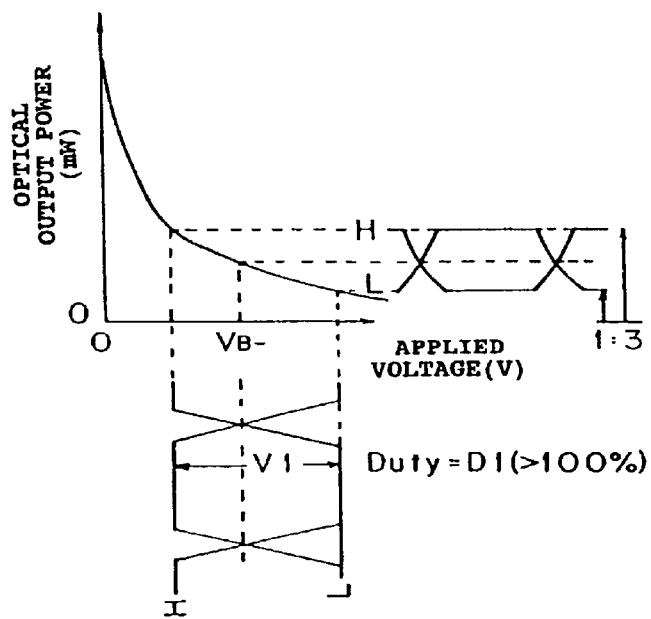
FIGS. 18A and 18B are diagrams for illustrating the operation of an optical transmitter shown in FIG. 12.

FIG. 18A corresponds to the case that a bias voltage $V_{B-}$ having a relatively large absolute value is set to obtain a negative chirp parameter α. In the example shown, the bias voltage $V_{B-}$ corresponds to the cross point in the waveform of the optical signal.

Figure 18B:
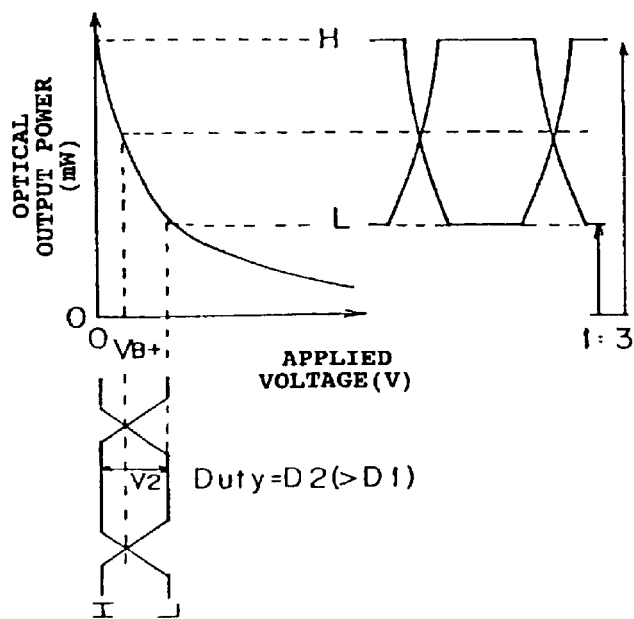

The characteristic curve shown in each of FIGS. 18A and 18B corresponds to the characteristic curve 228 shown in FIG. 16.

To improve the extinction ratio of the optical signal, the amplitude of the modulating signal $V_{MOD}$ is preferably increased with an increase in the absolute value of the bias voltage. In FIG. 18A, the extinction ratio of the optical signal is 1:3 for the amplitude V1 of the modulating signal $V_{MOD}$.

Further, the duty of the modulating signal $V_{MOD}$ is set to D1 (>100%) so that the cross point in the waveform of the optical signal coincides with the midpoint between the high level and the low level.

Optimum values of the amplitude and duty of the modulating signal $V_{MOD}$ are determined in one-to-one corresponding relationship with the bias voltage for a given characteristic curve. Accordingly, optimum values of the amplitude and duty of the modulating signal $V_{MOD}$ corresponding to various values of the bias voltage are preliminarily stored as a table in the ROM 242 shown in FIG. 12, and the CPU 240 computes target values of the amplitude and duty of the modulating signal $V_{MOD}$ according to the stored table.

In the case that a bias voltage $V_{B+}$ having a relatively small absolute value is set to obtain a positive chirp parameter α as shown in FIG. 18B, the amplitude of the modulating signal $V_{MOD}$ is changed to V2 (<V1), so as to maintain the extinction ratio constant. Further, the duty of the modulating signal $V_{MOD}$ is changed to D2 (>D1) so that the cross point in the waveform of the optical signal coincides with the midpoint between the high level and the low level.

It is to be noted here that the output power of the optical signal decreases with an increase in the absolute value of the bias voltage in the case that the power of the CW light is constant. In this preferred embodiment, a target value of the bias current to be supplied from the bias current circuit 250 to the LD 216 is set so that the power of the CW light increases with an increase in the absolute value of the bias voltage.

To suppress variations in the output power of the optical signal due to changes in the bias voltage, feedforward control may be adopted. Optimum values of the bias current for the LD 216 corresponding to various values of the bias voltage are determined for a given characteristic curve. Accordingly, the optimum values of the bias current are preliminarily stored in the ROM 242, and a target value of the bias current for the LD 216 is calculated by the CPU 240 according to a value of the bias voltage taken from the bias voltage circuit 252.

Alternatively, feedback control for the bias current for the LD 216 may be performed because the photodetector 260 for receiving a part of the optical signal output from the MI-LD 212 is provided in the preferred embodiment shown in FIG. 12. That is, the CPU 240 sequentially calculates a target value of the bias current so that the output signal level of the photodetector 260 becomes constant, and the bias current circuit 250 supplies the calculated target value of the bias current to the LD 216.

When the absolute value of the bias voltage to be supplied to the EA modulator 220 is increased for the merit of obtaining a blue-shift chirping, for example, there arises a demerit that the extinction ratio of the output optical signal is degraded and the optical output power is reduced. Accordingly, it is preferable to determine the driving conditions for the EA modulator 220 according to losses and chromatic dispersion in the optical fiber transmission line 6 in consideration of the above-mentioned merit versus demerit trade-off. The driving parameters to be controlled include the temperature of the EA modulator 220 itself or the temperature of the MI-LD 212 in addition to the bias voltage for the EA modulator 220, the duty and amplitude of the modulating signal for the EA modulator 220, and the bias current for the LD 216 as mentioned above.

In the preferred embodiment shown in FIG. 12, the optical transmitter 8 includes the MI-LD 212, so that the efficiency of coupling between the light source and the modulator can be improved, and a high-output and compact optical transmitter can be provided. Further, temperature control for the light source and the modulator can be performed by the single temperature controller 248.

According to the preferred embodiment shown in FIG. 12, the chirp parameter α of the optical signal to be output from the optical transmitter 8 can be adjusted to an optimum value so that the bit error to be detected in the second terminal device 4 is minimized, in accordance with the specific operation of the control unit 10, thus suppressing the influence of a waveform degradation due to chromatic dispersion and nonlinearity.

The program for the operation of the control unit 10 may be modified in such a manner that the bias voltage circuit 252 selectively generates a first bias voltage for providing a positive first chirp parameter and a second bias voltage for providing a negative second chirp parameter. For example, in FIG. 17, values of –0.4 V and –1.7 V are given as the first and second bias voltages, respectively, so as to switch the chirp parameter between +1 and –1 respectively shown by points A and B. In this case, computation in the CPU 240 can be simplified as compared with the case that the CPU 240 calculates a target value of the bias voltage corresponding to an optimum value of the chirp parameter.

While the present invention is applied to a repeaterless system in the above preferred embodiment, at least one optical repeater including an optical amplifier may be arranged along the optical fiber transmission line 6.

According to the present invention as described above, it is possible to provide a method for optical fiber communication which can compensate for chromatic dispersion and nonlinearity to allow long-haul transmission, and to also provide a device and system for use in carrying out the method. In particular, the terminal device according to the present invention can control a chirp parameter according to supervisory information on a bit error detected in relation to an optical signal transmitted by an optical fiber transmission line, so that versatility to a change in transmission route or the like can be increased.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method comprising:
    outputting an optical signal having a chirping determined by a chirp parameter to an optical fiber transmission line, including generating said optical signal by optical modulation based on a modulating signal obtained by adding a redundancy code to a transmission data code;
    converting the optical signal transmitted by said optical fiber transmission line into an electrical signal;
    detecting a first error count when the chirp parameter is set to a positive value;
    detecting a second error count when the chirp parameter is set to a negative value;
    comparing the first error count with the second error count to provide a difference; and
    controlling said chirp parameter in accordance with the difference so that bit error detected is reduced, suppressing chromatic dispersion and nonlinearity.

2. A method according to claim 1, wherein said controlling including switching the sign of said chirp parameter.

3. A method according to claim 2, wherein:
    said outputting including generating said optical signal by optical modulation using a Mach-Zehnder optical modulator; and
    controlling including switching an operating point of said Mach-Zehnder optical modulator.

4. A method according to claim 1, said outputting including adjusting said chirp parameter to an optimum value so that said bit error detected is minimized.

5. A method according to claim 4, wherein:
    outputting including generating said optical signal by optical modulation using an electroabsorption optical modulator; and
    controlling including changing a bias voltage to be applied to said electroabsorption optical modulator.

6. A system comprising:
    first and second terminal devices; and an optical fiber transmission line connecting said first and second terminal devices;

said first terminal device comprising:

an optical transmitter outputting an optical signal having a chirping determined by a chirp parameter to said optical fiber transmission line, said optical transmitter generating said optical signal by optical modulation based on a modulating signal obtained by adding a redundancy code to a transmission data, and a control unit controlling said chirp parameter according to a control signal, said control unit correcting said bit error of said electrical signal according to said redundancy code;

said second terminal device comprising:

an optical receiver converting the optical signal transmitted by said optical fiber transmission line into an electrical signal, a monitor unit detecting a bit error of said electrical signal, said monitor unit comprising counting the number of corrections of said bit error obtained by said control unit, and a transmitter to transmit supervisory information on said bit error detected to said first terminal device; wherein said control signal is generated in said first terminal device so that said bit error detected is reduced, wherein the control unit determines a difference between a first error count detected when the chirp parameter is set to a positive value and a second error count detected when the chirp parameter is set to a negative value and generates the control signal based on the difference, suppressing chromatic dispersion and nonlinearity.

7. A system according to claim 6, wherein:

said optical transmitter comprises a light source outputting continuous wave (CW) light, and a Mach-Zehnder optical modulator for modulating said CW light to generate said optical signal; and said control unit includes a switcher to switch an operating point of said Mach-Zehnder optical modulator, thereby switching the sign of said chirp parameter.

8. A system according to claim 6, wherein:

said optical transmitter comprises a light source for outputting continuous wave (CW) light, and an electroabsorption optical modulator for modulating said CW light to generate said optical signal; and said control unit includes a changing unit to change a bias voltage to be applied to said electroabsorption optical modulator, thereby adjusting said chirp parameter to an optimum value so that said bit error detected is minimized.

9. A system according to claim 6, wherein:

said optical transmitter comprises a light source outputting continuous wave (CW) light, an encoder adding the redundancy code to the transmission data code to thereby generate the modulating signal, an optical modulator modulating said CW light according to said modulating signal to thereby generate said optical signal;

said optical receiver includes a decoder correcting said bit error of said electrical signal according to said redundancy code; and said monitor unit includes a counter to count the number of corrections of said bit error obtained by said decoder.

10. A system according to claim 6, wherein:

said first terminal device further comprises an optical amplifier amplifying the optical signal output from said optical transmitter.

11. A system according to claim 6, wherein:

said second terminal device further comprises an optical amplifier amplifying the optical signal to be received by said optical receiver.

12. A system according to claim 6, wherein said optical fiber transmission line is provided by a dispersion shifted fiber having a zero-dispersion wavelength near 1.55 µm.

13. A system according to claim 6, wherein said optical fiber transmission line is provided by a single-mode fiber having a zero-dispersion wavelength near 1.3 µm.

14. A system according to claim 13, wherein said first terminal device further comprises a dispersion compensating fiber compensating for chromatic dispersion occurring in said optical fiber transmission line, and an optical amplifier amplifying the optical signal output from said optical transmitter.

15. A terminal device comprising:

an optical transmitter outputting an optical signal having a chirping determined by a chirp parameter to an optical fiber transmission line, said optical signal generated by optical modulation based on a modulating signal obtained by adding a redundancy code to a transmission data code;

a receiver to receive supervisory information on a bit error detected in relation to the optical signal transmitted by said optical fiber transmission line; and a controller to control said chirp parameter according to said supervisory information so that said bit error detected is reduced, wherein said supervisory information includes a first error count detected when the chirp parameter is set to a positive value and a second error count detected when the chirp parameter is set to a negative value, and wherein the controller determines a difference between the first error count and the second error count and controls the chirp parameter based on the difference, suppressing chromatic dispersion and nonlinearity.

* * * * *

UNITED STATES PATENT AND TRADEMARK OFFICE
CERTIFICATE OF CORRECTION

PATENT NO.         : 7,006,769 B1
APPLICATION NO.    : 09/256079
DATED              : February 28, 2006
INVENTOR(S)        : Yumiko Kawasaki et al.

It is certified that error appears in the above-identified patent and that said Letters Patent is hereby corrected as shown below:

On the cover page, (56) References Cited, U.S PATENT DOCUMENTS, column 1, line 1, after "Aoki" insert --359/180--

On the cover page, (56) References Cited, U.S PATENT DOCUMENTS, column 1, line 3, after "Taga et al." insert --359/158--

On the cover page, (56) References Cited, U.S PATENT DOCUMENTS, column 2, line 1, after "Alexander et al." insert --359/125--

On the cover page, (56) References Cited, U.S PATENT DOCUMENTS, column 2, line 2, after "Ishikawa et al." insert --359/181--

On the cover page, (56) References Cited, U.S PATENT DOCUMENTS, column 2, line 3, after "Ishizaka" insert --359/154--

On the cover page, (56) References Cited, U.S PATENT DOCUMENTS, column 2, line 4, after "Utsumi" insert --359/110--

On the cover page, (56) References Cited, U.S PATENT DOCUMENTS, column 2, line 5, after "Brenner et al." --372/102--

On the cover page, (56) References Cited, U.S PATENT DOCUMENTS, column 2, line 6, after "Roberts" insert --359/173--

Signed and Sealed this

Eighth Day of August, 2006

JON W. DUDAS
*Director of the United States Patent and Trademark Office*